United States Patent
Williams (10) Patent No.: US 11,645,458 B2
(45) Date of Patent: May 9, 2023

(54) SYSTEMS AND METHODS FOR AUTOMATICALLY SCRUBBING SENSITIVE DATA (71) Applicant: PAYPAL, INC., San Jose, CA (US)

(72) Inventor: David Williams, Aptos, CA (US)

(73) Assignee: PayPal, Inc., San Jose, CA (US)

( * ) Notice: Subject to any disclaimer, the term of this patent is extended or adjusted under 35 U.S.C. 154(b) by 642 days.

(21) Appl. No.: 16/665,959

(22) Filed: Oct. 28, 2019

(65) Prior Publication Data
US 2021/0124800 A1  Apr. 29, 2021

(51) Int. Cl.
*G06F 40/205* (2020.01)
*G06F 21/62* (2013.01)
*G06F 40/30* (2020.01)
*G06F 40/295* (2020.01)

(52) U.S. Cl.
CPC ........ *G06F 40/205* (2020.01); *G06F 21/6245* (2013.01); *G06F 21/6254* (2013.01); *G06F 40/295* (2020.01); *G06F 40/30* (2020.01)

(58) Field of Classification Search
None
See application file for complete search history.

(56) References Cited

U.S. PATENT DOCUMENTS 8,561,185 B1 * 10/2013 Muthusrinivasan ......... G06F 21/6245 705/51
9,514,172 B2 * 12/2016 Hadjieleftheriou ......... G06F 16/2272
2007/0266079 A1  11/2007 Criddle et al.
2015/0193638 A1  7/2015 Cook
2018/0198602 A1 * 7/2018 Duffy ....................... H04L 9/008
2019/0102574 A1  4/2019 Roberts et al.
2020/0051552 A1 * 2/2020 Kothuvatiparambil ...................... G10L 15/30
2021/0125615 A1 * 4/2021 Medalion ............ G10L 15/1815
2021/0226953 A1 * 7/2021 Rose ....................... H04L 63/10

OTHER PUBLICATIONS

Ribaric, Slobodan, Aladdin Ariyaeeinia, and Nikola Pavesic. "De-identification for privacy protection in multimedia content: A survey." Signal Processing: Image Communication 47 (2016): 131-151. (Year: 2016).*

(Continued)

*Primary Examiner* — Frank D Mills
(74) *Attorney, Agent, or Firm* — Haynes and Boone, LLP (57) ABSTRACT

Methods and systems are presented for automatically scrubbing sensitive data from text data comprising a sequence of words based on a negative word index. The negative word index may be constructed by obtaining articles that are publicly available and extracting words and word sequences from the articles. Statistical information associated with the word and word sequences from the articles may also be determined and included in the negative word index. To scrub sensitive data from the text data, a first sub-sequence of words is identified from the text data. The first sub-sequence of words may be determined to include sensitive information or not based on statistical information associated with the first sub-sequence of words within the negative word index. If the first sub-sequence of words includes sensitive information, the first sub-sequence of words may be removed from the text data.

20 Claims, 7 Drawing Sheets

(56) References Cited

OTHER PUBLICATIONS

Bishop et al., "Deep Learning for Data Privacy Classification", Worcester Polytechnic Institute, Nov. 4, 2018, 34 pages.
De-Identifying Sensitive Data, Cloud Data Loss Prevention, [https://cloud.google.com.dlp/], May 16, 2019, 35 pages.
Emily Rosche, "How to find personally identifiable data in your Google analytics", Google Analytics, Nov. 2, 2017, 12 pages.
"What are stop words in text analysis?", Quora, 8 pages.

* cited by examiner

SYSTEMS AND METHODS FOR AUTOMATICALLY SCRUBBING SENSITIVE DATA

BACKGROUND

The present specification generally relates to data processing, and more specifically, to automatically scrubbing sensitive data in natural language according to various embodiments of the disclosure.

RELATED ART

Organizations often log transcripts of communications conducted with their customers (e.g., phone calls, online chats, emails, etc.) for various reasons, such as for record-keeping, training, or other purposes alike. It is conceivable that the logged communications may contain sensitive data such as personally identifiable information (PII), protected health information (PHI), or other information a user may not want disclosed publicly or be made available the public. Depending on the jurisdiction in which the organizations reside, the organizations may be required to remove the sensitive data upon requests by the customers, and/or provide heightened security measures in storing and protecting the sensitive data.

It may be challenging to retrieve and remove the sensitive data after it is stored along with the transcripts of the communications. For example, without previously having identified the sensitive data within the transcripts, the entire transcript associated with a particular customer may be required to be deleted from the system based on the particular customer's request, which causes the organizations to lose potentially important information. Furthermore, when the transcripts that include sensitive data are used to train a machine learning model (e.g., a neural network) for performing a specific task, the sensitive data might be embedded deep within the machine learning model (e.g., within one or more hidden layers of the model) such that it might be impossible to remove the sensitive data from the machine learning model, other than erasing all of the learned information and completely re-training the machine learning model.

Thus, there is a need for automatically and accurately identifying and removing sensitive data from the logged communications before they are stored in a data storage or used to train a machine learning model.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically scrubbing sensitive data (e.g., personally identifiable information (PII), protected health information (PHI), etc.) from text data such that non-sensitive information within the text data can be extracted, stored, and used by organizations. Sensitive data, as defined herein, may include information that can be used to identify an entity (e.g., person, an organization, etc.), such as a name, an address, a social security number, a birthday, etc., information that can be used to access a space (e.g., a building, an online account, etc.) such as passwords, account numbers, payment card numbers, etc. or medical information related to a person such as health data. In some embodiments, the text data may be provided in natural language, such as words obtained from a dialogue (or conversation) between the organizations and their customers (e.g., phone conversations, online chats, emails, etc.).

Identifying sensitive data within natural language poses unique challenges. For example, unlike data obtained from a form (e.g., a web form) where each piece of data is labeled with their names and/or types, the sensitive data included in the natural language are usually not labeled or otherwise identified. As such, the sensitive data may be hidden among non-sensitive data within the text data. Furthermore, the sensitive data within the text data may vary in format and in length. For example, one person's name may include a single word while another person's name may include five words. In another example, one person may provide her address in full starting with the street name, then the city, the state, and the zip code, while another person may only provide her address in an order of the city and then the street address, while omitting the state and the zip code. Thus, a keyword-based or a format-based approach would not be effective in identifying the sensitive data in natural language.

To solve the challenges described above, a data scrubbing system of some embodiments may use a negative word index that includes non-sensitive data (e.g., words and word sequences that do not include sensitive data) to identify and remove sensitive data from the text data. The negative word index may be constructed based on publicly available information. As defined herein, publicly available information may include information that is accessible by the general public, such as articles or documents found in public library, accessible on the Internet, etc. In general, publicly available information does not contain any sensitive data.

For example, the data scrubbing system may crawl or scrape a network (e.g., the Internet) to retrieve publicly available articles and documents (e.g., articles from Wikipedia, from news media websites, etc.) provided by third-parties. The data scrubbing system may then extract words and word sequences from the retrieved articles and documents (also referred to as a word corpus) to construct the negative word index. Thus, the negative word index may include words and word sequences that are deemed to be non-sensitive data.

In some embodiments, the data scrubbing system may determine different word lengths (e.g., different n-grams) for constructing the negative word index, such that words and word sequences in those word lengths are extracted from the word corpus and inserted into the negative word index. For example, the data scrubbing system may determine to use single words (e.g., 1-gram), two-word sequences (e.g., 2-grams), and three-word sequences (e.g., 3-grams) to construct the negative word index. In other examples, the data scrubbing system may use less number of word lengths or more number of word lengths (e.g., also including 4-grams, 5-grams, and 6-grams, etc.) for constructing the negative word index. The data scrubbing system may then extract words (e.g., all single words from the word corpus) and word sequences (e.g., all two-word and three-word sequences) from the word corpus, and insert the extracted words and word sequences into the negative word index. In some embodiments, the data scrubbing system may eliminate duplicate words and word sequences such that each unique instance of words and word sequences only appear once in the negative word index.

The data scrubbing system of some embodiments may also include, in the negative word index, statistical information of each word and each word sequence within the word corpus. For example, for each word and word sequence, the data scrubbing system may determine a frequency (e.g., a count) of the word or word sequence in the word corpus and/or a number of different articles in which the word or word sequence appears in the word corpus and insert the statistical information in the negative word index.

The data scrubbing system may receive requests to remove sensitive data from text data. For example, as a service provider obtains text data (e.g., communication data, such as a transcript of a phone conversation, an online chat session, an email communication, etc.), the service provider may request the data scrubbing system to remove any sensitive data included in the text data before storing and/or using the text data. In some embodiments, the data scrubbing system may identify sensitive data in the text data based on the negative word index. Since the negative word index includes non-sensitive words and word sequences, the data scrubbing system may consider that words and word sequences in the text data that are not included in the negative word index as sensitive data, and remove them from the text data.

In some embodiments, the data scrubbing system may parse the text data to identify sensitive data using the negative word index. Different embodiments may use different techniques to parse the text data. In some embodiments, the data scrubbing system may parse the text data using a sliding window mechanism. For example, the data scrubbing system may generate an imaginary sliding window. The sliding window may be generated in different sizes to include different numbers of words in the text data. In some embodiments, the data scrubbing system may initially generate the sliding window in a size that includes the largest number of words in a word sequence in the negative word index (e.g., a three-word size when the largest sequence of words in the negative word index is a 3-gram). The data scrubbing system may then place the sliding window on the first word(s) of the text data, and may analyze the word(s) within the sliding window.

To analyze the word(s) within the sliding window, the data scrubbing system of some embodiments may try to match the word(s) within the sliding window with a word or a word sequence in the negative word index. If there is a match in the negative word index, the data scrubbing system may determine whether the statistical information associated with the matched word or sequence of words exceeds a threshold determined for the n-gram (e.g., the size of the sliding window). If it is determined that the statistical information (e.g., the frequency of the n-gram) exceeds the threshold, the data scrubbing system may determine that the word(s) included in the sliding window are non-sensitive data, and thus may retain the word(s) in the text data. The data scrubbing system may then leave the word(s) within the sliding window in the text data, and may slide the sliding window over the text data by the same number of words as the size of the sliding window. For example, when the sliding window has a size to include three words, the data scrubbing system may slide the sliding window by three words in the text data to include the next three words in the text data. The data scrubbing system may then analyze the new word(s) in the sliding window using the same techniques described herein.

On the other hand, if it is determined that the statistical information associated with the matched word or sequence of words does not exceed the threshold, or that there is no match of the word(s) in the negative word index, the data scrubbing system may resize the sliding window. For example, the data scrubbing system may reduce the size of the sliding window by one word (e.g., from three words to two words) to exclude the last word in the sliding window. The data scrubbing system may analyze the word(s) inside the resized sliding window using the techniques described herein and iteratively resize the sliding window until the statistical information associated with a matched word or sequence of words exceeds the corresponding threshold. For example, the data scrubbing system may again try to match the word(s) inside the resized sliding window with a word or a sequence of words in the negative word index, and may determine whether the associated statistical information exceeds a threshold determined for the size of the sliding window. It is noted that the thresholds for different sliding window sizes may be different from each other. For example, the thresholds may be determined to be inversely proportional to the sliding window size (e.g., the larger the sliding window size, the smaller the threshold) as shorter word sequences should naturally occur at a higher frequency than longer word sequences. If it is determined that the statistical information associated with the matched word or sequence of words exceeds the threshold corresponding to the size of the current sliding window (e.g., two-word size), the data scrubbing system may retain the word(s) within the sliding window and may slide the sliding window over the text data by the size of the current sliding window (e.g., two words). In some embodiments, the data scrubbing system may also revert the size of the sliding window to its initial size (e.g., three-word size) after sliding the sliding window to the next words. The data scrubbing system may then analyze the new word(s) in the sliding window using the same techniques described herein. However, if it is determined that the statistical information associated with the matched word or sequence of words does not exceed the threshold, or that there is no match of the word(s) in the negative word index, the data scrubbing system may again resize the sliding window.

Thus, the data scrubbing system may continue to resize the sliding window until the sliding window only includes one word. When the sliding window only includes one word and the statistical information of the matched word in the negative word index does not exceed a corresponding threshold for a 1-gram or there is no matched word in the negative word index, the data scrubbing system may determine that the word in the sliding window includes sensitive information, and may remove the word from the text data. In some embodiments, the data scrubbing system may replace the word in the sliding window with a symbol or a filler (e.g., "<redacted>") to indicate that a word has been taken out from the text data.

After removing (or replacing) the word in the sliding window, the data scrubbing system may then move the sliding window by one word and revert to its initial size (e.g., a three-word size) to include the next word subsequence in the text data. In some embodiments, the data scrubbing system may continue to analyze the words in the sliding window using the techniques described herein until the data scrubbing system finishes parsing the entire text data. After processing the text data by the data scrubbing system, the processed text data would include only non-sensitive information having all of the sensitive information removed and/or redacted. The data scrubbing system may then provide the processed text data to the service provider such that the service provider can safely store and/or use the processed text data.

Figure 1:
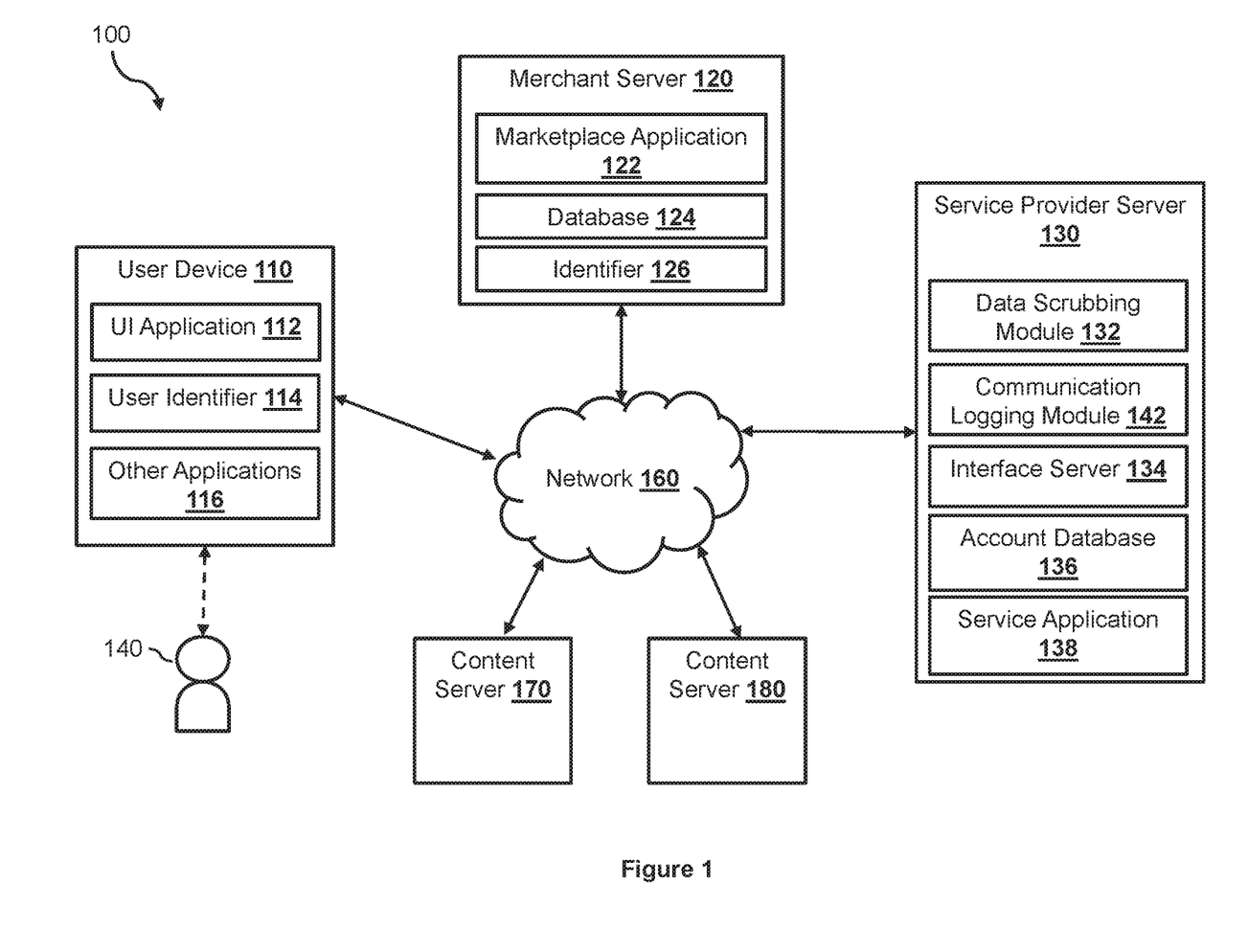
FIG. 1 is a block diagram illustrating an electronic transaction system according to an embodiment of the present disclosure.

FIG. 1 illustrates a system 100, within which the data scrubbing system may be implemented according to one embodiment of the disclosure. The system 100 includes a service provider server 130, a merchant server 120, a user device 110, and content servers 170 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct online transactions with the merchant server 120 via a website hosted by or mobile applications associated with the merchant server 120. The user 140 may log in to a user account to access account services or conduct electronic transactions (e.g., account transfers or payments) with the service provider server 130, and may communicate with the service provider associated with the service provider server 130 via a phone call, an online chat session, and/or e-mail communication. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) and/or communicate with the merchant server 120, and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also communicate with the service provider using a phone, an online chat session, or email.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130. In some embodiments, the service provider server 130 may enable the user 140 to communicate with the service provider. For example, the service provider server 130 may provide a phone number that the user 140 may call to initiate a conversation (e.g., via automated response such as interactive voice response or via a human agent). In another example, the service provider server 130 may provide an online chat platform such that the user 140 may communicate with a chat bot or a human agent of the service provider via an online chat session conducted over the website of the service provider or the mobile application. In yet another example, the service provider server 130 may include or connected to an email server for communicating with the user 140 via emails.

In some embodiments, the service provider server 130 includes a communication logging module 142 configured to log a transcript of communications with users (e.g., the user 140 of the user device 110) and merchants (e.g., the merchant of the merchant server 120). As such, the communication logging module 142 may be communicatively coupled with the interface server 134, a phone server (not shown) of the service provider, and an email server of the service provider. Upon detecting an initiation of a new communication (e.g., an incoming phone call, an initiation of an online chat session, an incoming email, etc.), the communication logging module 142 of some embodiments may generate a transcript of such a communication. The communication logging module 142 may provide the transcript to other modules for use, for example, for training a machine learning model to perform a specific task (e.g., to provide automated response over the phone or over the online chat session).

In various embodiments, the service provider server 130 includes a data scrubbing module 132 that implements the data scrubbing system as discussed herein. The data scrubbing module 132 is configured to identify and remove sensitive data from text data that includes a sequence of words. For example, the data scrubbing module 132 may receive a request from the communication logging module 142 to remove sensitive data from a logged transcript of a communication with a user. Upon receiving the request, the data scrubbing module 132 may identify and remove sensitive data from the logged transcript using the techniques described herein, and may provide a processed transcript to the communication logging module 142, such that the processed transcript (not having any sensitive information) may be safely stored and used by other modules of the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the profile matching module 132 to match profiles to the entity. In certain embodiments, account information also includes user purchase profile information such as account funding options and payment options associated with the user, payment information, receipts, and other information collected in response to completed funding and/or payment transactions.

Figure 2:
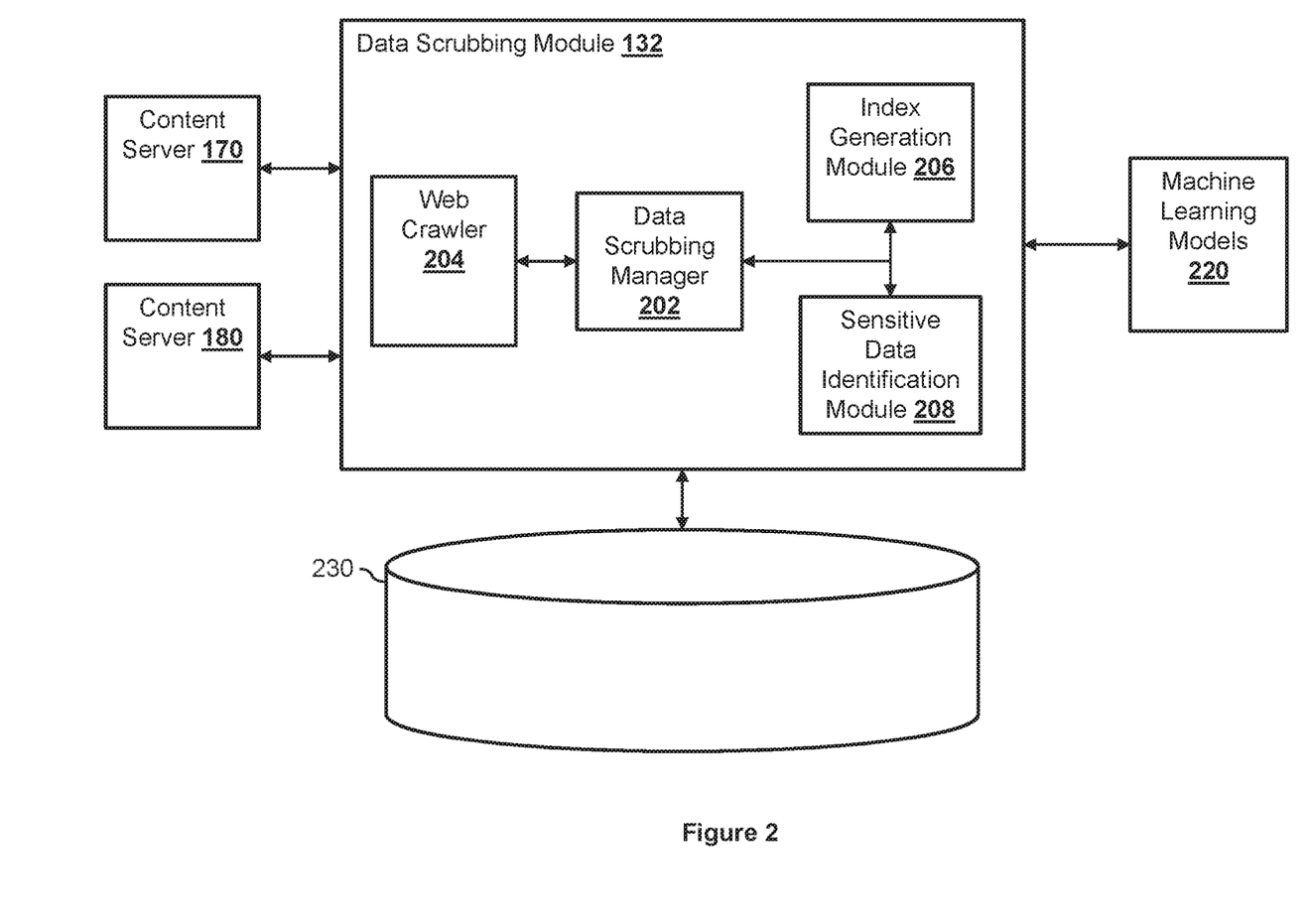
FIG. 2 is a block diagram illustrating a data scrubbing module according to an embodiment of the present disclosure.

FIG. 2 illustrates a block diagram of the data scrubbing module 132 according to an embodiment of the disclosure. The data scrubbing module 132 includes a data scrubbing manager 202, a web crawler 204, an index generation module 206, and a sensitive data identification module 208. The data scrubbing manager 202 may use the web crawler 204 to search for and retrieve publicly available articles and documents (e.g., Wikipedia articles, articles and documents from news media websites, etc.). The text obtained from the retrieved articles and documents may form a word corpus of non-sensitive text. The data scrubbing manager 202 may then use the index generation module 206 to generate a negative word index based on the word corpus. In some embodiments, the index generation module 206 may generate the negative word index by extracting single words and sequences of words in various lengths (e.g., two-word sequences, three-word sequences, etc.), The index generation module 206 may also analyze the words and sequences of words in the word corpus (e.g., a frequency of occurrence, a number of different articles and/or documents in which the words or sequences of words appear, etc.) and include the statistical information in the negative word index.

When the data scrubbing module 132 receives a request to remove sensitive data from text data, for example, from the communication logging module 142, the sensitive data identification module 208 may identify sensitive data within the text data based on the negative word index, and remove the identified sensitive data from the text data. After removing the sensitive data, the processed text data may be provided to the entity that submitted that request (e.g., the communication logging module 142). The processed text data does not include any sensitive information, and therefore is safe for storage and used by other modules, such as for training the machine learning models 220 for performing various tasks.

Figure 3:
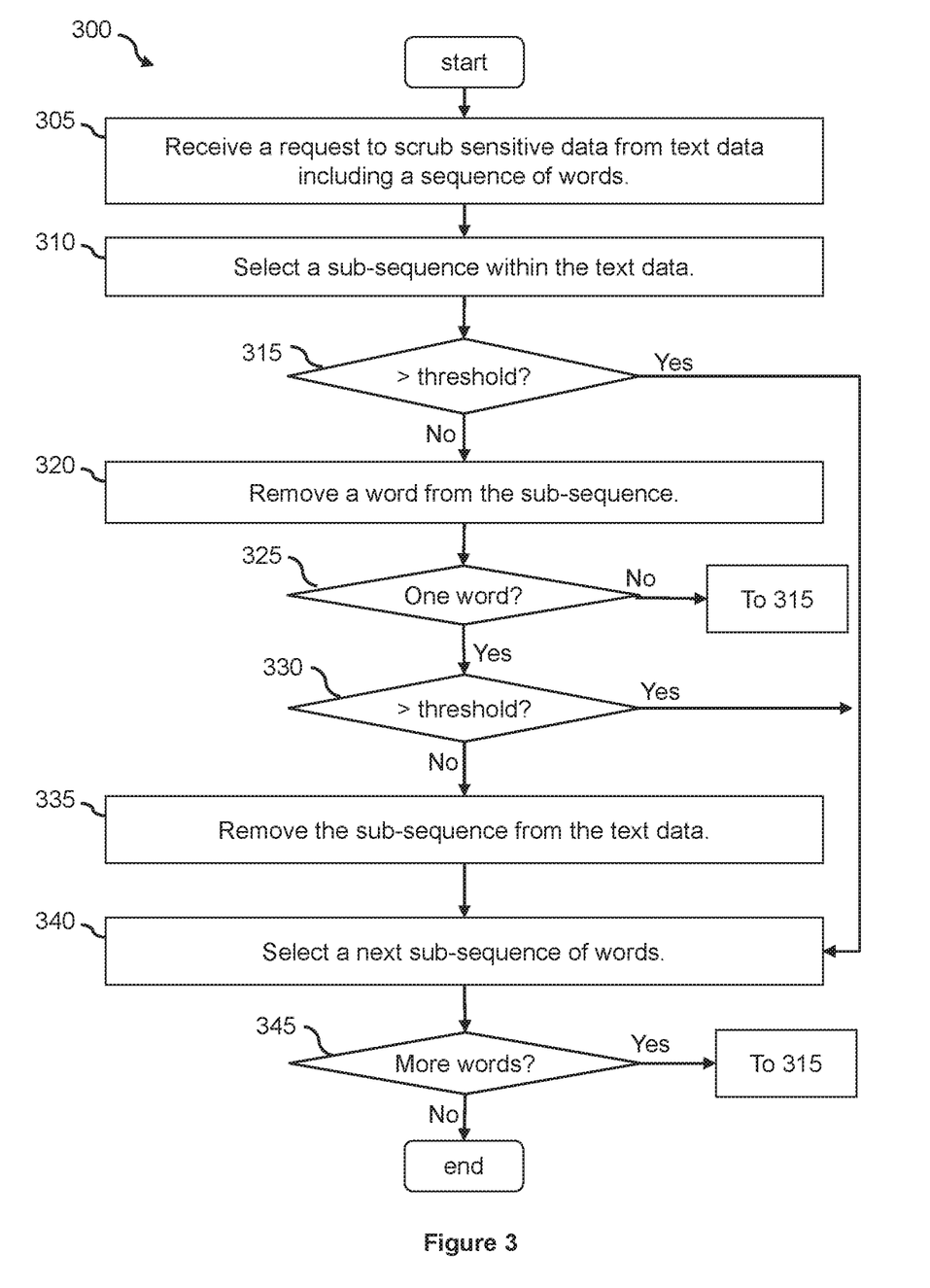
FIG. 3 is a flowchart showing a process of automatically identifying and removing sensitive data in natural language according to an embodiment of the present disclosure.

FIG. 3 illustrates a process 300 for removing sensitive data from text data according to various embodiments of the disclosure. In some embodiments, the process 300 may be performed by the data scrubbing module 132 of the service provider server 130. The process 300 begins by receiving (at step 305) a request to scrub sensitive data from text data that includes a sequence of words. As discussed above, the service provider associated with the service provider server 130 may provide one or more mechanisms for communicating with its customers. For example, the service provider may provide a hotline that enables that customers (e.g., the user 140) to call and speak with either an IVR system or a human agent. The service provider server 130 may also provide an online chat platform that enables customers (e.g., the user 140) to use their user device (e.g., the UI application 112) to conduct an online chat with a chat bot or a human agent. Furthermore, the service provider server 130 may also enable its customers (e.g., the user 140) to communicate with the service provider via email (e.g., by providing hosting an email server and providing an e-mail address, etc.). In some embodiments, the communication logging module 142 may be configured to log transcripts of all communications conducted between the service provider and its customers. As such, the logged transcripts may include a sequence of words communicated by the user 140 and/or the service provider. The logged transcripts may then be stored for various purposes, such as for record-keeping, training, or other purposes alike. However, during the course of communicating with the service provider, the customers (e.g., the user 140) may intentionally or unintentionally provide sensitive information (e.g., PII such as names, ages, addresses, social security numbers, account numbers, bank account numbers, answers to security questions, etc., and/or PHI such as health condition, prescription information, etc.).

Storing such sensitive information of its customers may be detrimental to the service provider, as they may be required to remove the sensitive information at a later time or to provide heightened electronic security for securing the sensitive information. The problem is exacerbated when the transcripts of the communication that include the sensitive information have been used to train a machine learning model, as the sensitive information may have been embedded deep in the machine learning model (e.g., in the hidden layers, within the code of the machine learning model, etc.), which makes it difficult or even impossible to remove without erasing all of the learned information and completely re-training the machine learning model.

As such, after logging a transcript of a communication (e.g., a phone call, an online chat session, an e-mail message) between the user 140 and the service provider, the communication logging module 142 may submit to the data scrubbing module 132 a request to remove sensitive data from the transcript. In addition to the communication logging module 142, other modules of the service provider server 130 (e.g., the service application 138) or external devices (e.g., the merchant server 120) may also submit requests to the data scrubbing module 132 for removing sensitive data from different types of text data (e.g., documents, transcripts, data records, etc.).

Figure 4:
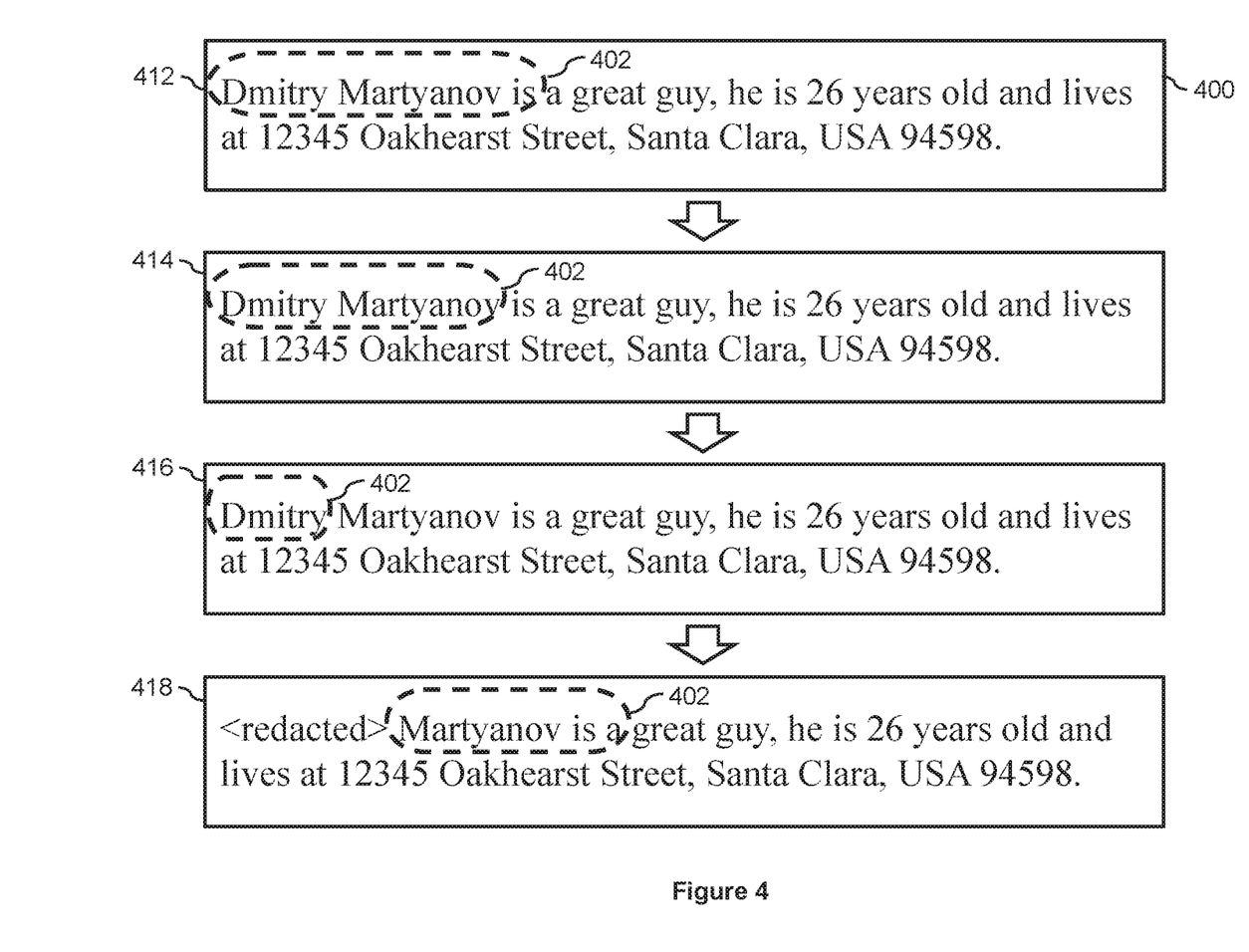
FIG. 4 illustrates an example of removing sensitive data from text data using a sliding window mechanism according to an embodiment of the present disclosure.

FIG. 4 illustrates example text data 400 included in such a request. As shown in the figure, the text data 400 is a transcript from a communication between the user 140 and the service provider. The text data, containing the sequence of words: "Dmitry Martyanov is a great guy, he is 26 years old and lives at 12345 Oakhearst Street, Santa Clara, USA 94598," includes sensitive information such as a name ("Dmitry Martyanov"), an age ("26 years old"), and an address ("12345 Oakhearst Street, Santa Clara, USA 94598").

The process 400 then selects (at step 310) a sub-sequence of words within the text data. In some embodiments, the data scrubbing module 132 is configured to scrub sensitive data from the text data by matching words and/or sequences of words with a negative word index. The negative word index includes various n-grams (sequences of words in n length, such as one word, two words, and three words) that are deemed to include non-sensitive information. The negative word index may be constructed in different manners. In some embodiments, the data scrubbing manager 202 may use the web crawler 204 to obtain publicly available information. For example, the web crawler 204 may be configured to retrieve articles and documents that are made available in the public from remote content servers, such as content servers 170 and 180. In one example, the content server 170 may be associated with an online encyclopedia (e.g., Wikipedia, etc.). In another example, the content server 180 may be associated with one or more news media (e.g., CNN, BBC, etc.).

After retrieving various articles and documents containing publicly available text data (also referred to as a "word corpus"), the data scrubbing manager 202 may use the index generation module 206 to generate the negative word index based on the word corpus. In some embodiments, the data scrubbing manager 202 may determine a number of different n-grams for constructing the negative word index. An n-gram is a word or a sequence of words containing n words). In some embodiments, the data scrubbing manager 202 may use a machine learning model to predict the largest word length (e.g., the largest n in the n-gram). For example, the data scrubbing manager 202 may determine to use (or select) a 1-gram, a 2-gram, and a 3-gram for constructing the negative word index. The index generation module 206 may then extract single words (corresponding to the selection of the 1-gram), sequences of two words (corresponding to the selection of the 2-gram), and sequences of three words (corresponding to the selection of the 3-gram) from the word corpus, and may populate the negative word index with the extracted words and sequences of words. In some embodiments, the data scrubbing system may eliminate duplicate words and word sequences such that each unique instance of words and word sequences only appear once in the negative word index.

In some embodiments, the index generation module 206 may also determine statistical information of each word and each word sequence within the word corpus, and may include the statistical information in the negative word index. For example, for each word and word sequence, the data scrubbing system may determine a frequency (e.g., a count) of the word or word sequence in the word corpus and/or a number of different articles in which the word or word sequence appears in the word corpus. The index generation module 206 may then associate the statistical information with the corresponding word or word sequence in the negative word index. For example, the index generation module 206 may determine that the 1-gram "the" appears in the word corpus 12,342 times and within 546 different articles. The index generation module 206 may then include such statistical information in the negative word index and associate it with the 1-gram "the." In another example, the index generation module may determine that the 3-gram "a great guy" appears in the word corpus 364 times and within 35 different articles. The index generation module 206 may then include such statistical information in the negative word index and associate it with the 3-gram "a great guy."

Furthermore, the index generation module 206 may also determine different thresholds for the different n-grams for determining whether a particular word or a particular word sequence includes sensitive information or not. In some embodiments, the thresholds may be associated with the statistical information determined for the different words and word sequences. As such, the index generation module 206 may determine the threshold based on the statistical information associated with the corresponding number of words (e.g., an average frequency for all 1-grams, etc.). For example, the index generation module 206 may determine a frequency threshold for each of the different n-grams (e.g., a frequency threshold, such as 100,000, for the 1-gram, a frequency threshold, such as 50,000, for the 2-gram, and a frequency threshold, such as 10,000, for the 3-grams), and a number of different articles threshold for each of the different n-grams (e.g., a number of different articles threshold, such as 1,000, for the 1-gram, a number of different articles threshold, such as 500, for the 2-gram, and a number of different articles threshold, such as 100, for the 3-grams). In some embodiments, the thresholds generated for the n-grams are inversely proportional to the number of words in the n-grams. Thus, the frequency threshold and the number of different articles threshold determined for the 3-gram are smaller than the frequency threshold and the number of different articles threshold determined for the 2-gram. This is due to the fact that a particular 3-word sequence generally occurs less frequently than a particular 2-word sequence. The index generation module 206 may also store the thresholds in the negative word index. The index generation module 206 may then store the negative word index, for example, in the database 230. In other embodiments, the index generation module 206 may weigh sources found that contain the particular word or word sequence. For example, if the source is a readily available link or document, such as a Wikipedia page, that will weigh more heavily determining the contained word(s) are not sensitive. However, if the source is an obscure article in a non-native language of the user or location, that will weigh less heavily in the determination. Another factor is how often the word(s) appear in publicly available content. For example, if the word(s) appear in X or more number of documents, that would weigh more heavily that the word(s) is not sensitive. However, if the word(s) only appear in less than X number of documents, it is more likely that the word(s) would still be deemed sensitive. Combinations of availability or accessibility of the source and number of appearances in different sources can be weighed in combination. Thus, different factors can be considered in determining whether a word or word sequence is to be added to the negative word index.

Once the negative word index has been constructed, the data scrubbing manager 202 may use the sensitive data identification module 208 to begin identifying and removing sensitive data from various text data. As such, when the data scrubbing module 132 receives the request to remove sensitive data from text data (e.g., from the communication logging module 142), the data scrubbing manager 202 may provide the text data (e.g., the text data 400) to the sensitive data identification module 208 to identify and remove the sensitive data within the text data 400.

In some embodiments, the sensitive data identification module 208 identifies sensitive data by identifying text (e.g., words or sub-sequences of words) within the text data 400 that does not include sensitive data. For example, the sensitive data identification module 208 may consider a word or a sub-sequence of words within the text data 400 as non-sensitive data (e.g., words that do not include sensitive information) when the word or the sub-sequence of words appears in the word corpus more than a predetermined number of times. As such, the sensitive data identification module 208 may parse the text data 400 to try to match words and/or sub-sequences of words within the text data 400 with the n-grams (words and word sequences) in the negative word index, and determine whether the statistical information of the matched words and/or word sequences exceeds corresponding thresholds.

In some embodiments, the sensitive data identification module 208 may parse the text data 400 using a sliding window mechanism. For example, the sensitive data identification module 208 may generate an imaginary sliding window. The sliding window may have a size corresponds to the largest number of words in the n-grams in the negative word index. Thus, when the negative word index was constructed using 1-grams, 2-grams, and 3-grams, the initial size of the sliding window may be generated initially in a 3-word size (e.g., a window that covers three words in the text data). The sensitive data identification module 208 may provide the sliding window at the beginning of the text data 400 to highlight the first sub-sequence of words (e.g., the first three words) of the text data 400. As shown in stage 412 of FIG. 4, a sliding window 402 is provided to highlight the first three words ("Dmitry Martyanov is") of the text data 400.

The process 300 then determines (at step 315) whether a match of the sub-sequence of words exists in the negative word index and if so, whether the statistical information associated with the matched word sequence exceeds a threshold. For example, the sensitive data identification module 208 may determine whether the negative word index includes the sub-sequence of words "Dmitry Martyanov is." In some embodiments, to enhance the word sequence lookup performance, the negative word index may be constructed as a hash table, where the n-grams (the words and sequences of words) are hashed to provide a table entry. The statistical information, such as the frequencies and the numbers of different articles, may then be stored in the corresponding table entries.

Thus, the sensitive data identification module 208 may hash the sub-sequence of words "Dmitry Martyanov is" to determine if a corresponding table entry exists in the negative word index. If such a table entry exists (e.g., there is a matched word sequence in the word corpus), the sensitive data identification module 208 may determine whether the statistical information in the table entry exceeds the thresholds determined for 3-grams (e.g., whether the frequency included in the table entry exceeds the frequency threshold determined for the 3-grams and/or whether the number of different articles included in the table entry exceeds the number of different articles threshold determined for the 3-grams). If it is determined that the statistical information included in the table entry corresponding to the matched word sequence exceeds the threshold(s), the process 300 skips the sub-sequence of words highlighted by the sliding window and selects (at step 340) a next sub-sequence of words. For example, if the sensitive data identification module 208 determines that the sub-sequence of words "Dmitry Martyanov is" exists in the negative word table and that the associated statistical information exceeds the threshold(s) determined for the 3-gram, the sensitive data identification module 208 may consider that the word(s) included in the sliding window 402 as non-sensitive data (e.g., does not include sensitive data). Thus, the sensitive data identification module 208 may retain the sub-sequence of words in the text data 400, and may move the sliding window 402 over by three words (e.g., moves the same number of words as the size of the sliding window 402) to highlight and analyze the next sub-sequence of words (e.g., the next three words).

However, if it is determined that there is no match of the sub-sequence of words in the negative word index or that the statistical information included in the table entry corresponding to the matched word sequence does not exceed the threshold(s), the process 300 removes (at step 320) a word from the sub-sequence of words. For example, the sensitive data identification module 208 may reduce the size of the sliding window 402 (e.g., from a 3-word size to a 2-word size). As shown in stage 414 of FIG. 4, the sliding window 402 is reduced in size to include only two words of the text data 400. As such, the sliding window 402 is now highlighting only the first two words "Dmitry Martyanov" of the text data 400.

The process 300 then determines (at step 325) whether the sliding window includes only one word. If it is determined that the sliding window includes more than one word, the process 300 reverts back to step 315 to continue to analyze the sub-sequence of words highlighted by the sliding window by determining whether a match of the sub-sequence of words exists in the negative word index and if so, whether the statistical information associated with the matched word sequence exceeds a threshold. For example, the sensitive data identification module 208 may determine whether the negative word index includes the modified sub-sequence of words "Dmitry Martyanov" by, for example, hashing the words "Dmitry Martyanov." If such a table entry exists (e.g., there is a matched word sequence in the word corpus), the sensitive data identification module 208 may determine whether the statistical information in the table entry exceeds the thresholds determined for 2-grams (e.g., whether the frequency included in the table entry exceeds the frequency threshold determined for the 2-grams and whether the number of different articles included in the table entry exceeds the number of different articles threshold determined for the 2-grams). If the sensitive data identification module 208 determines that the sub-sequence of words "Dmitry Martyanov" exists in the negative word table and that the associated statistical information exceeds the threshold(s) determined for the 2-gram, the sensitive data identification module 208 may consider that the word(s) included in the sliding window 402 as non-sensitive data (e.g., does not include sensitive data). Thus, the sensitive data identification module 208 may retain the sub-sequence of words in the text data 400, and may move the sliding window 402 over by two words (e.g., moves the same number of words as the size of the sliding window 402).

However, if it is determined that there is no match of the sub-sequence of words in the negative word index or that the statistical information included in the table entry corresponding to the matched word sequence does not exceed the threshold(s), the sensitive data identification module 208 may again reduce the size of the sliding window 402 (e.g., from a 2-word size to a 1-word size). As shown in stage 416 of FIG. 4, the sliding window 402 is reduced in size to include only one word of the text data 400. As such, the sliding window 402 is now highlighting only the first word "Dmitry" of the text data 400.

When it is determined that the sub-sequence of words only includes one word at the step 325, the process 300 determines (at step 330) whether a match of the word exists in the negative word index and if so, whether the statistical information associated with the matched word exceeds a threshold. For example, the sensitive data identification module 208 may determine whether the negative word index includes the word "Dmitry" (e.g., determining whether a table entry corresponding to hashing the word "Dmitry" exists in the negative word index). If such a table entry exists (e.g., there is a matched word sequence in the word corpus), the sensitive data identification module 208 may determine whether the statistical information in the table entry exceeds the thresholds determined for 1-grams (e.g., whether the frequency included in the table entry exceeds the frequency threshold determined for the 1-grams and/or whether the number of different articles included in the table entry exceeds the number of different articles threshold determined for the 1-grams). If it is determined that the statistical information included in the table entry corresponding to the matched word sequence exceeds the threshold(s), the process 300 skips the sub-sequence of words highlighted by the sliding window and selects (at step 340) a next sub-sequence of words. For example, if the sensitive data identification module 208 determines that the word "Dmitry" exists in the negative word table and that the associated statistical information exceeds the threshold(s) determined for the 1-gram, the sensitive data identification module 208 may consider that the word included in the sliding window 402 as non-sensitive data (e.g., does not include sensitive data). Thus, the sensitive data identification module 208 may retain the word in the text data 400, and may move the sliding window 402 over by 1 word (e.g., moves the same number of words as the size of the sliding window 402) and revert the size of the sliding window to its initial size (e.g., a 3-word size). The sensitive data identification module 208 may then analyze the sub-sequence of words (e.g., the next three words) highlighted by the sliding window 402.

However, if it is determined that there is no match of the word in the negative word index or that the statistical information included in the table entry corresponding to the matched word does not exceed the threshold(s) at the step 330, the process 300 removes (at step 335) the sub-sequence of words from the text data and selects (at step 340) a next sub-sequence of words. For example, the sensitive data identification module 208 may remove the word "Dmitry" (highlighted by the sliding window 402 in stage 416) from the text data 400. In some embodiments, the sensitive data identification module 208 may replace the word with a symbol or a filler (e.g., another word such as "<redacted>", etc.) to indicate that the word has been redacted or removed. As shown in stage 418 of FIG. 4, the word "Dmitry" has been replaced with a filler "<redacted>." The sensitive data identification module 208 may also move the sliding window 402 over by 1 word (e.g., moves the same number of words as the size of the sliding window 402) and revert the size of the sliding window to its initial size (e.g., a 3-word size). The sensitive data identification module 208 may then analyze the sub-sequence of words (e.g., the next three words) highlighted by the sliding window 402.

Figure 5:
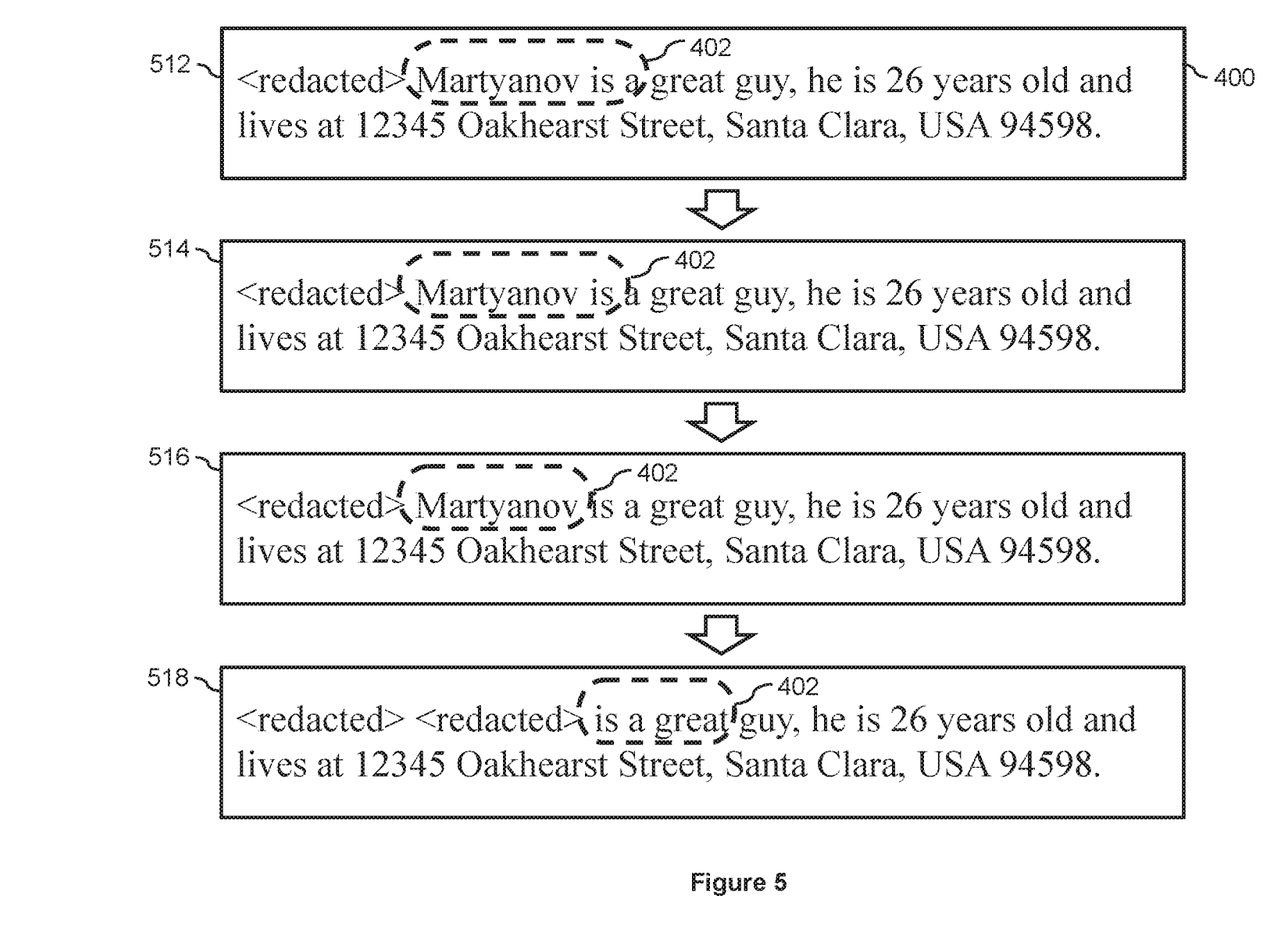
FIG. 5 illustrates another example of removing sensitive data from text data using a sliding window mechanism according to an embodiment of the present disclosure.

FIG. 5 illustrates another example of identifying and removing sensitive data based on the text data 400. Stage 512 of FIG. 5 is identical to stage 418 of FIG. 4, after the first word "Dmitry" has been removed from the text data 400. As shown, the sliding window 402 has been reverted to its initial size (e.g., a 3-word size) to highlight the next sub-sequence of words (e.g., the next three words "Martyanov is a") in the text data 400. Using the process 300, the sensitive data identification module 208 may first determine whether the sub-sequence of words ("Martryanov is a") includes sensitive data. For example, the sensitive data identification module 208 may hash the sub-sequence of words and determine whether a table entry corresponding to the hashed value exists in the negative word index. In this example, the sensitive data identification module 208 may determine that either the sub-sequence of words does not exist in the negative word index or that the statistical information associated with the matched word sequence does not exceed the threshold(s) (e.g., 'no' in step 315), the sensitive data identification module 208 may reduce the size of the sliding window 402 and analyze the sub-sequence of words ("Martyanov is") in the modified sliding window 402, as illustrated in stage 514 of FIG. 5.

The sensitive data identification module 208 may again determine that either the sub-sequence of words does not exist in the negative word index or that the statistical information associated with the matched word sequence does not exceed the threshold(s) (e.g., 'no' in step 315). Thus, the sensitive data identification module 208 may further reduce the size of the sliding window 402 and analyze the sub-sequence of words ("Martyanov") in the modified sliding window 402, as illustrated in stage 514 of FIG. 5.

Assuming there is not a matched word for "Martyanov" in the negative word index, the sensitive data identification module 208 may replace the word "Martynaov" with a filler ("<redacted>") and move the sliding window 402 over to highlight the next sub-sequence of words (e.g., the next three words "is a great"), as illustrated in stage 518 of FIG. 5.

Figure 6:
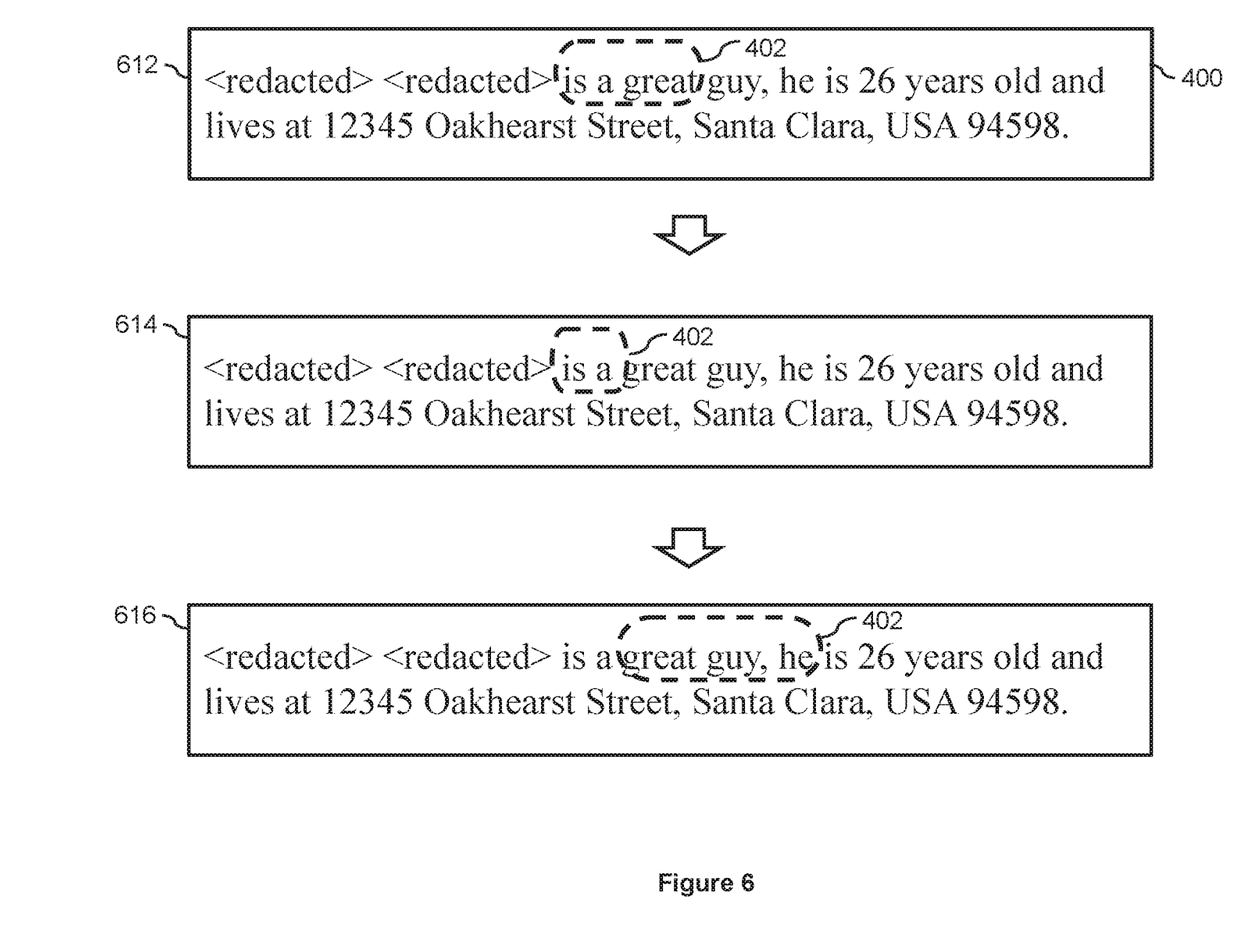
FIG. 6 illustrates another example of removing sensitive data from text data using a sliding window mechanism according to an embodiment of the present disclosure.

FIG. 6 illustrates another example of identifying and removing sensitive data based on the text data 400. Stage 612 of FIG. 6 is identical to stage 518 of FIG. 5, after the word "Martyanov" has been removed from the text data 400. As shown, the sliding window 402 has been reverted to its initial size (e.g., a 3-word size) to highlight the next sub-sequence of words (e.g., the next three words "is a great") in the text data 400. Using the process 300, the sensitive data identification module 208 may first determine whether the sub-sequence of words ("is a great") includes sensitive data. For example, the sensitive data identification module 208 may hash the sub-sequence of words and determine whether a table entry corresponding to the hashed value exists in the negative word index. In this example, the sensitive data identification module 208 may determine that either the sub-sequence of words does not exist in the negative word index or that the statistical information associated with the matched word sequence does not exceed the threshold(s) (e.g., 'no' in step 315), the sensitive data identification module 208 may reduce the size of the sliding window 402 and analyze the sub-sequence of words ("is a") in the modified sliding window 402, as illustrated in stage 514 of FIG. 5.

Since the word sequence "is a" is a common sequence, the sensitive data identification module 208 may find a match in the negative word index, and may determine that the statistical data associated with the word sequence "is a" exceeds the threshold(s) determined for the 2-grams. As such, the sensitive data identification module 208 may consider that the word(s) included in the sliding window 402 ("is a") as non-sensitive data (e.g., does not include sensitive data). Thus, the sensitive data identification module 208 may retain the sub-sequence of words ("is a") in the text data 400, and may move the sliding window 402 over by two words (e.g., moves the same number of words as the size of the sliding window 402). The sensitive data identification module 208 may also revert the size of the sliding window 402 to its initial size (e.g., a 3-word size). As shown in stage 616 of FIG. 6, the sliding window 402 has been moved to highlight the next three words ("great guy, he"). The sensitive data identification module 208 may continue to analyze words and sub-sequences of words within the text data 400 until it finishes parsing the text data 400 (e.g., until it is determined that there are no more words at step 345 of the process 300). After processing all of the text in the text data 400 by the sensitive data identification module 208, the processed text data may include the words "<redacted> <redacted> is a great guy, he is <redacted> years old and lives at <redacted> <redacted> Street, Santa Clara, USA <redacted>."

The data scrubbing manager 202 may then provide the processed text data to the entity that submitted the request (e.g., the communication logging module 142). The techniques described herein for removing sensitive data based on the negative word index enable accurate identification (and removal) of sensitive data without excessively removing other non-sensitive data that might be useful to the service provider server 130. After scrubbing the data, the service provider server 130 may safely store and/or use the processed data, for example, to store in the database 230 and/or to train the machine learning models 220.

Figure 7:
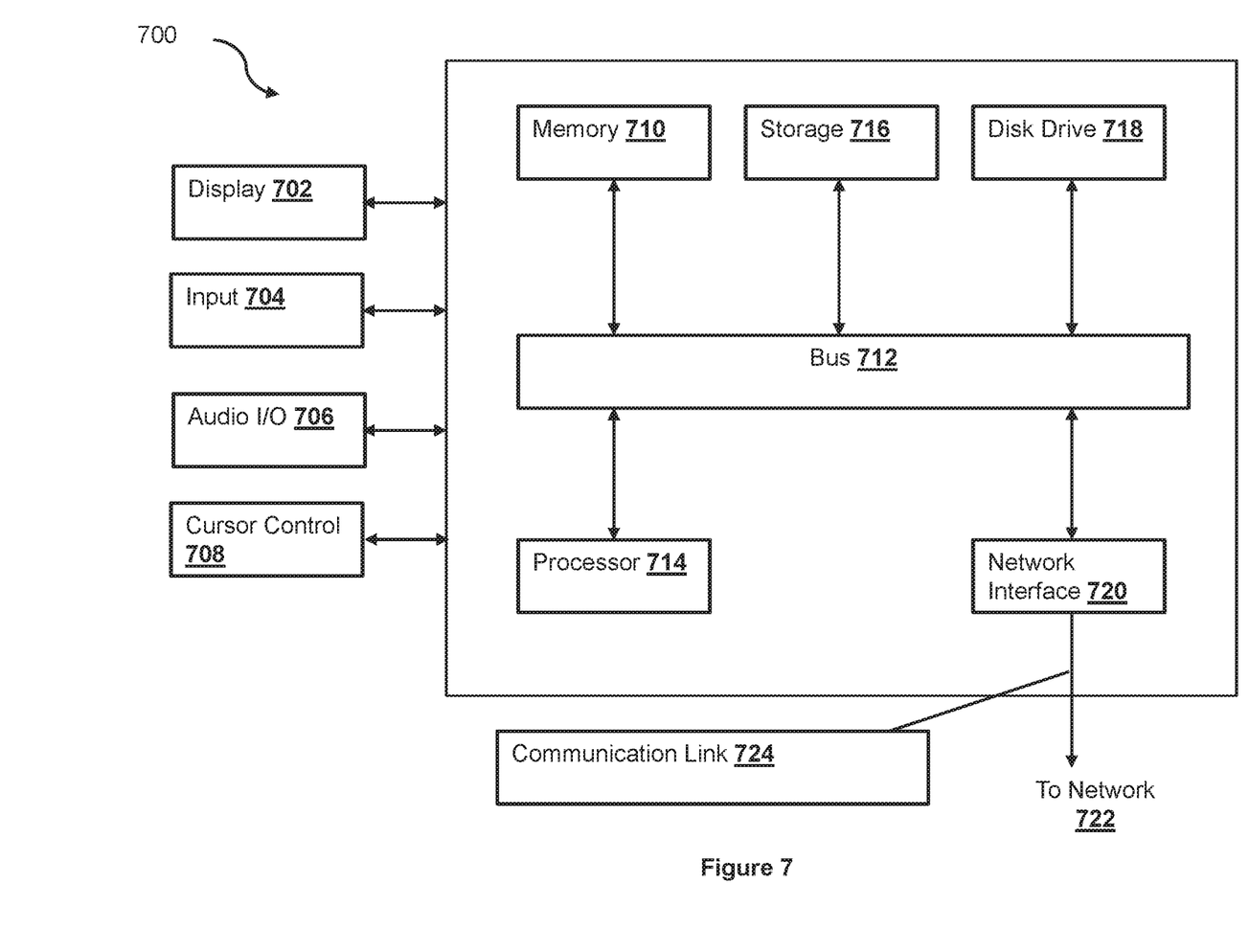
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, the content servers 170 and 180, and the user device 110. In various implementations, the user device 110 may include a mobile cellular phone, personal computer (PC), laptop, wearable computing device, etc. adapted for wireless communication, and each of the service provider server 130, the merchant server 120, and the content servers 170 and 180 may include a network computing device, such as a server. Thus, it should be appreciated that the devices 110, 120, 130, 170, and 180 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the position detection of webpage elements described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and one or more hardware processors coupled with the non-transitory memory and configured to read instructions from the non-transitory memory to cause the system to perform operations comprising:
  generating a negative word index based on a word corpus comprising non-sensitive data, wherein the negative word index comprises a plurality of groups of n-grams, wherein each group in the plurality of groups of n-grams comprises word sequences having a particular word length, and wherein each word sequence is associated with a frequency value representing a number of times that the word sequence appears in the word corpus;
  receiving a request to remove sensitive data from text data comprising a sequence of words;
  identifying a first sub-sequence of words within the sequence of words based on a virtual sliding window;
  matching the first sub-sequence of words within the sequence of words with a first n-gram in the negative word index;
  determining whether the first sub-sequence of words includes sensitive data based on comparing a first frequency value associated with the first n-gram against a threshold;
  in response to determining that the first sub-sequence of words includes sensitive data, reducing a size of the virtual sliding window to select a second sub-sequence of words consisting of a portion of the first sub-sequence of words;
  determining whether the second sub-sequence of words includes sensitive data based on the negative word index; and
  in response to determining that the second sub-sequence of words includes sensitive data, removing the second sub-sequence of words from the text data.

2. The system of claim 1, wherein the operations further comprise storing the text data in a data storage after removing the second sub-sequence of words from the text data.

3. The system of claim 1, wherein the size of the virtual sliding window is reduced by excluding a last word from the first sub-sequence of words.

4. The system of claim 1, wherein the operations further comprise:
  subsequent to removing the second sub-sequence of words from the text data, moving the virtual sliding window to select a third sub-sequence of words in the sequence of words;
  determining whether the third sub-sequence of words within the sequence of words includes sensitive data based on the negative word index; and
  in response to determining that the third sub-sequence of words does not include sensitive data, retaining the third sub-sequence of words in the text data.

5. The system of claim 1, wherein the operations further comprise:
  determining that the first frequency value is below the threshold based on the comparing; and
  determining that the first sub-sequence of words includes sensitive data based on the determining that the first frequency value is below the threshold.

6. The system of claim 4, wherein the third sub-sequence of words comprises a portion of the first sub-sequence of words and one or more words that follow the first sub-sequence of words.

7. The system of claim 1, wherein the second sub-sequence of words comprises a single word.

8. A method, comprising:
  receiving, by one or more hardware processors, a request to remove sensitive data from text data comprising a sequence of words;
  accessing a negative word index generated based on a word corpus comprising non-sensitive data, wherein the negative word index comprises a plurality of word sequences having different word lengths, and wherein each word sequence in the negative word index is associated with a value representing a statistical characteristic associated with the word sequence appearing in the word corpus;
  identifying, by the one or more hardware processors, a first sub-sequence of words from the sequence of words based on a sliding window;
  determining, by the one or more hardware processors, that the first sub-sequence of words includes sensitive data based at least in part on a failure to match the first sub-sequence of words with any word sequence in the negative word index or a first value associated with a first word sequence in the negative word index that corresponds to the first sub-sequence of words;
  in response to determining that the first sub-sequence of words includes sensitive data, reducing, by the one or more hardware processors, a size of the sliding window to select a second sub-sequence of words consisting of a portion of the first sub-sequence of words;
  determining whether the second sub-sequence of words includes sensitive data based on the negative word index; and
  in response to determining that the second sub-sequence of words includes sensitive data, removing, by the one or more hardware processors, the second sub-sequence of words from the text data.

9. The method of claim 8, wherein the first value indicates a number of different documents in which the first word sequence appears in the word corpus.

10. The method of claim 8, wherein the first sub-sequence of words has a particular word length, wherein the method further comprises:
  identifying a set of word sequences in the negative word index based on the particular word length, wherein each word sequence in the set of word sequences has the particular word length;
  determining statistical data associated with the set of word sequences appearing in the word corpus; and
  comparing the first value against a threshold determined based on the statistical data.

11. The method of claim 8, wherein the first sub-sequence of words includes three or more words.

12. The method of claim 8, wherein the first sub-sequence of words includes at least one of an address, a funding account number, a gender, a name, or an age.

13. The method of claim 8, wherein the text data comprises a transcript of a communication with a user.

14. The method of claim 8, further comprising:
  subsequent to removing the second sub-sequence of words from the text data, moving the sliding window to select a third sub-sequence of words in the sequence of words;
  determining whether the third sub-sequence of words includes sensitive data based on the negative word index; and
  in response to determining that the third sub-sequence of words does not include sensitive data, retaining the third sub-sequence of words in the text data.

15. A non-transitory machine-readable medium having stored thereon machine-readable instructions executable to cause a machine to perform operations comprising:
- receiving a request to remove sensitive data from text data comprising a sequence of words;
- accessing a negative word index generated based on a word corpus comprising non-sensitive words, wherein the negative word index comprises a plurality of word sequences having different word lengths, wherein each word sequence in the negative word index is associated with a value representing a statistical characteristic of the word sequence appearing in the word corpus;
- determining, based on a sliding window, a first sub-sequence of words within the sequence of words;
- matching the first sub-sequence of words with a first word sequence in the negative word index;
- determining whether the first sub-sequence of words includes sensitive data based on comparing a first value associated with the first word sequence against a threshold;
- in response to determining that the first sub-sequence of words includes sensitive data, reducing a size of the sliding window to select a second sub-sequence of words consisting of a portion of the first sub-sequence of words;
- determining whether the second sub-sequence of words within the sequence of words includes sensitive data based on the negative word index; and
- in response to determining that the second sub-sequence of words includes sensitive data, removing the second sub-sequence of words from the text data.

16. The non-transitory machine-readable medium of claim 15, wherein the operations further comprise training a machine learning model based on the text data after the removing the second sub-sequence of words.

17. The non-transitory machine-readable medium of claim 15, wherein the operations further comprise:
- subsequent to removing the second sub-sequence of words from the text data, identifying a third sub-sequence of words based on the sliding window;
- determining whether the third sub-sequence of words includes sensitive data based on the negative word index; and
- in response to determining that the third sub-sequence of words does not include sensitive data, retaining the third sub-sequence of words in the text data.

18. The non-transitory machine-readable medium of claim 17, wherein the operations further comprise:
- matching the third sub-sequence of words with a second word sequence in the negative word index; and
- comparing a second value associated with the second word sequence against the threshold, wherein the third sub-sequence of words is determined to not include sensitive data based on the second value exceeding the threshold.

19. The non-transitory machine-readable medium of claim 15, wherein the first sub-sequence of words has a particular word length, wherein the operations further comprise:
- identifying, from the plurality of word sequences within the negative word index, a set of word sequences based on the particular word length, wherein each word sequence in the set of word sequences has the particular word length;
- determining statistical data associated with the set of word sequences within the negative word index; and
- determining the threshold based on the statistical data.

20. The non-transitory machine-readable medium of claim 15, wherein the first sub-sequence of words includes at least one of an address, a funding account number, a gender, a name, or an age.

\* \* \* \* \*